UNITED STATES PATENT OFFICE.

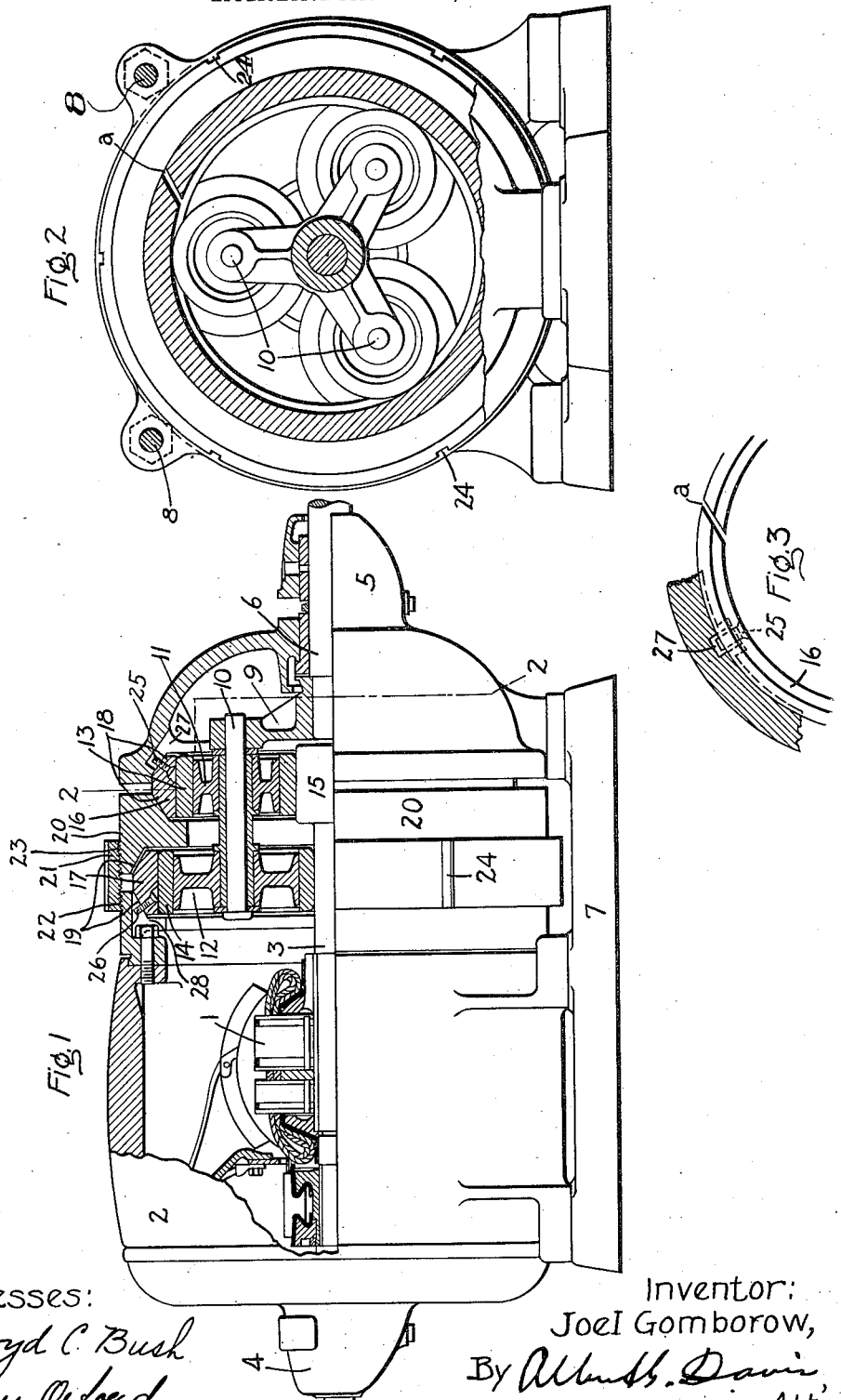

JOEL GOMBOROW, OF LYNN, MASSACHUSETTS, ASSIGNOR TO GENERAL ELECTRIC COMPANY, A CORPORATION OF NEW YORK.

FRICTIONAL GEARING.

No. 861,110.

Specification of Letters Patent.

Patented July 23, 1907.

Application filed December 8, 1905. Serial No. 290,934.

*To all whom it may concern:*

Be it known that I, JOEL GOMBOROW, a citizen of the United States, residing at Lynn, county of Essex, State of Massachusetts, have invented certain new and useful Improvements in Frictional Gearings, of which the following is a specification.

The present invention relates to friction gearing or couplings for connecting two shafts together so as to cause them to be operated at different relative speeds, and particularly to those couplings known as "centrator couplings" wherein a series of friction rings bear respectively upon the driving shaft and upon a fixed track or bearing and impart motion to the driven shaft through the medium of rolls carried by the driven shaft and projecting into the rings.

In couplings of the character described, after the adjustments are once made the ratio between the speeds of the driving and driven shafts remains constant but it may happen that it is desirable to change this ratio at times, and the present invention therefore contemplates a novel and simple construction and arrangement of parts for permitting the ratio between the speeds of the driving and driven shafts to be altered.

The present invention will be more fully understood from the following description thereof taken in connection with the accompanying drawing.

In said drawing Figure 1 shows partly in side elevation and partly in longitudinal section an electric motor having its shaft coupled to a driven shaft by mechanism arranged in accordance with the present invention; Fig. 2 is a cross-section taken on line 2—2 of Fig. 1; and Fig. 3 is a detail.

Reference being had to the drawing, 1 represents a motor armature, 2 the field ring, and 3 the armature shaft. The armature shaft is journaled at one end in a bearing 4 of the usual type. The end bearing member 5 at the opposite side of the motor is displaced axially and supports, instead of the armature shaft, a shaft 6 which is adapted to be coupled to and driven from the armature shaft. The end bearing member 5 and the field frame may be rigidly held together in any suitable way, as by means of a base 7 on which both are mounted and bolts 8. The centrator coupling is arranged within the space between the end bearing member 5 and the field ring and comprises means for connecting the two shafts in different relations with each other.

In the particular arrangement shown there are but two adjustments, although it is evident that this number may be varied. Thus, there are two centrator couplings, each having its own track ring, together with means for rendering either of the couplings inactive and the other active.

On the inner end of the shaft 6 there is a spider 9, to the arms of which are secured stub shafts 10 extending parallel with the axis of the machine. On each of the stub shafts are arranged two rolls 11 and 12 having different diameters. Surrounding these rolls are friction rings 13 and 14, respectively. The friction rings 13 engage with an enlarged portion 15 of the armature shaft, while the rings 14 engage with a portion of the armature shaft of less diameter. 16 and 17 are the track rings with which the friction rings 13 and 14, respectively, coöperate. These track rings are of the ordinary split ring type, that is, they are open-ended rings, as indicated at *a* in Figs. 2 and 3. Each track ring is provided on its outer surface with double inclines 18 and 19, respectively. One of the inclines 18 is adapted to coöperate with a complementary incline on the end bearing member 5, and one of the inclines 19 in like manner coöperates with a complementary incline associated with the field ring. An intermediate ring 20 is provided on opposite sides with inclined faces adapted to coöperate respectively with one of the inclines on the ring 16 and the corresponding incline on the ring 17. By moving ring 20 laterally in one direction or the other, one of the track rings, depending upon the direction of movement, will be compressed and the shaft 6 will be driven through the friction rings coöperating with this particular ring. Thus, when the ring 20 is moved to the right, the track 16 is compressed and the friction ring 13 comes into play, while the friction rings 14 run idle. When the ring 20 is moved to the left, track ring 16 is released and track ring 17 comes into play, the shaft 16 being now driven through friction rings 14; and the friction rings 13 remaining idle.

Any suitable means may be provided for shifting the ring 20 and for this purpose I have shown a nut 21 engaging screw-threads 22 associated with the field ring and threads 23 on the ring 20. By making one of the screw-threads right-handed and the other left-handed, the turning of the nut produces a lateral movement of the ring 20. The nut may be rotated in any desired manner, as by means of a tool engaging notches 24 arranged about the periphery of the nut. The track rings 16 and 17 are prevented from rotating by set-screws 25 and 26, respectively, which engage in grooves 27 and 28 on the fixed framework so as to hold the rings against rotation at the same time permitting them to be compressed and to move laterally slightly.

It will now be seen that by the present invention I have provided means whereby a plurality of speed reductions may be obtained from a motor shaft through a simple and easily performed operation and without removing any of the working parts from their position.

It is of course understood that the present invention in its broader aspects is not confined to the particular details of construction shown on the drawing, but that various changes may be made without departing from the scope of the present invention.

What I claim as new, and desire to secure by Letters Patent of the United States, is,—

1. In combination, a driving shaft, a driven shaft, a plurality of sets of friction rings revolubly mounted on said driven shaft for rotation therewith and adapted to engage with said driving shaft, track rings coöperating with said friction rings, and an adjusting ring coöperating with said track rings for bringing either track ring into operative relation with the corresponding friction rings.

2. In combination, a driving shaft, a driven shaft, a plurality of sets of friction rings revolubly mounted on said driving shaft for rotation therewith and adapted to engage with said driving shaft, track rings coöperating with said friction rings, and means for simultaneously bringing either of said track rings into operative relation with the corresponding friction rings and releasing the other track ring from coöperation with its friction rings.

3. In combination, a driving shaft, a driven shaft, two sets of friction rings engaging with said driving shaft and revolubly mounted upon a member fixed to said driven shaft, a fixed shaft, a pair of contractile track rings each having an inclined face coöperating with an inclined face on said fixed support, an adjusting ring for forcing said track rings against the inclined faces on said supports, and means for alternately bringing said adjusting rings in coöperative relation with the track rings.

4. In combination, a driving shaft, a driven shaft, a plurality of sets of friction rings engaging with said driving shaft, means for revolubly supporting said friction rings upon a member fixed to and movable with the driven shaft, track rings coöperating with said friction rings, an adjusting ring, said adjusting ring and track rings having coöperating inclined faces, and means for simultaneously moving said adjusting ring into operative relation with either of said track rings and out of operative relation with the other track ring.

In witness whereof I have hereunto set my hand this fifth day of December, 1905.

JOEL GOMBOROW.

Witnesses:
JOHN A. MCMANUS, Jr.,
HENRY O. WESTENDARP.